(12) United States Patent
Terauchi

(10) Patent No.: US 6,222,631 B1
(45) Date of Patent: Apr. 24, 2001

(54) TWO-DIMENSIONAL SPECTRAL CHARACTERISTIC MEASURING APPARATUS

(75) Inventor: Koichi Terauchi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/226,160

(22) Filed: Jan. 7, 1999

(30) Foreign Application Priority Data

Jan. 8, 1998 (JP) .................................................. 10-002371

(51) Int. Cl.[7] ........................................................ G01J 3/51
(52) U.S. Cl. ............................................. 356/419; 250/226
(58) Field of Search ................................... 356/419, 416; 250/226

(56) References Cited

U.S. PATENT DOCUMENTS

| 5,214,494 | 5/1993 | Inaba et al. . |
| 5,306,233 | 4/1994 | Kawagoe et al. . |
| 5,432,609 | 7/1995 | Sugiyama et al. . |
| 5,457,530 | 10/1995 | Nagai . |
| 5,479,015 | 12/1995 | Rudman et al. . |
| 5,589,934 | 12/1996 | Hosoi et al. . |
| 5,592,294 | 1/1997 | Ota et al. . |
| 5,636,015 | 6/1997 | Imura et al. . |
| 5,729,011 | * 3/1998 | Sekiguchi .............................. 356/419 |
| 5,926,283 | * 7/1999 | Hopkins ............................... 356/419 |
| 6,031,619 | * 2/2000 | Wilken et al. ........................ 356/419 |

* cited by examiner

*Primary Examiner*—F. L. Evans
(74) *Attorney, Agent, or Firm*—McDermott, Will & Emery

(57) ABSTRACT

This spectral characteristic measuring apparatus measures two-dimensional spectral characteristics of a sample, and the apparatus includes a collimator lens, band-pass filters, lenses and an area sensor, which are arranged in order on an optical axis L. The collimator lens transforms light outputted from the sample into a pencil of parallel light. The band-pass filters have mutually-different passbands. The lenses have an identical focal distance and are arranged in correspondence with the band-pass filters. The area sensor is arranged at the focal points of the lenses and constructed of a number of imaging devices such as CCDs arranged two-dimensionally. As described above, the images spectrally separated by the band-pass filters are formed in mutually-different positions on the area sensor. Therefore, the two-dimensional spectral characteristics of the sample can be simultaneously measured with the simple construction.

12 Claims, 2 Drawing Sheets

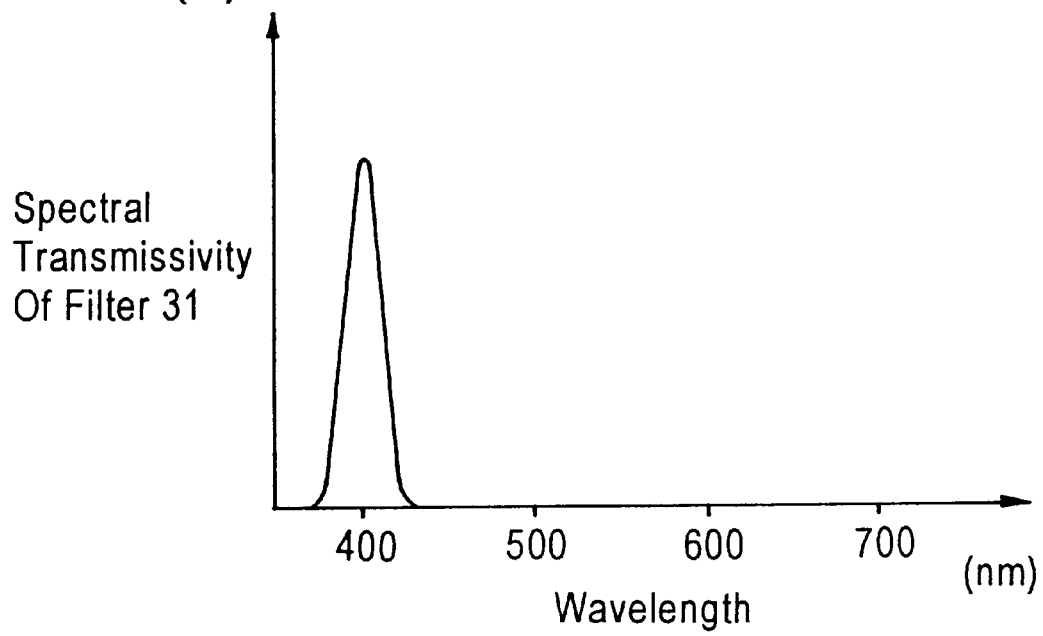
FIG. 2(a) Spectral Transmissivity Of Filter 31
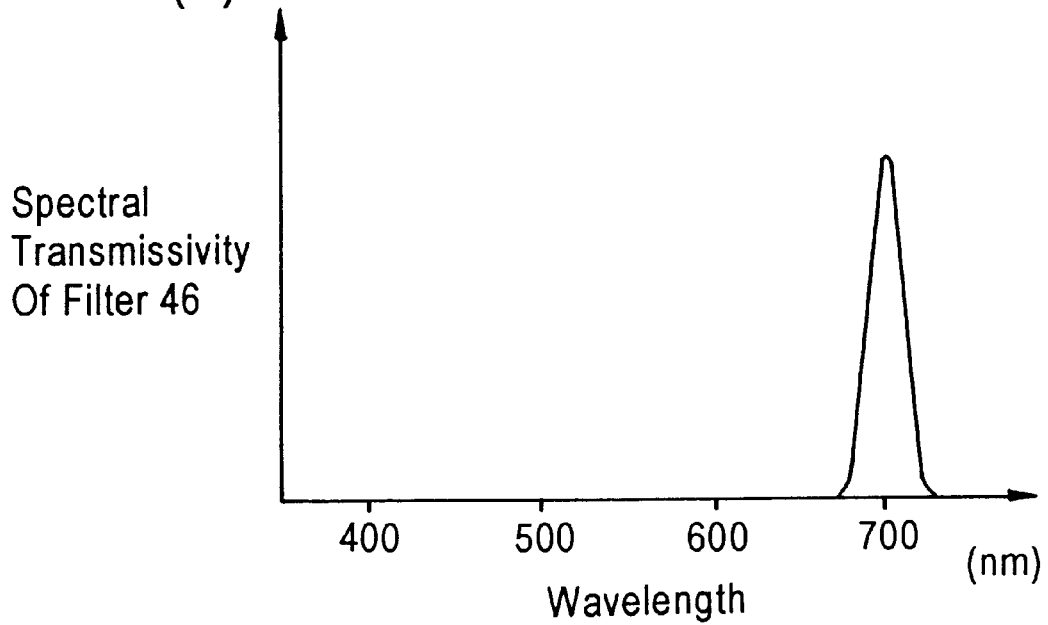
FIG. 2(b) Spectral Transmissivity Of Filter 46

TWO-DIMENSIONAL SPECTRAL CHARACTERISTIC MEASURING APPARATUS

This application is based on application No. 10-2371 filed in Japan, the content of which is hereby incorporated by reference.

BACKGROUND OF THE INVENTION

1. Field of the Invention

The present invention relates to a two-dimensional spectral characteristic measuring apparatus for measuring the two-dimensional spectral characteristics of a sample.

2. Description of the Related Art

In order to measure the two-dimensional, or planar spectral characteristics of a sample, the following methods (1) through (3) have conventionally been used.

(1) A turntable having a plurality of band-pass filters of which the passbands are different from one another is arranged between a sample and an imaging means for imaging a two-dimensional image of the sample, and this turntable is turned to sequentially change the filters through which light from the sample penetrates.

(2) There is provided a plurality of sets having filters of which the passbands are different from one another, each set being comprised of a band-pass filter of a very small size and an imaging means, and they are made to scan a sample.

(3) A plurality of dichroic mirrors of which the light reflection wavelengths are different from one another are arranged parallel to each other, and imaging means corresponding to the directions in which lights from a sample are reflected are arranged, whereby the two-dimensional image of the sample is imaged by the imaging means.

However, the above methods (1) and (2), which necessitate the turning of the turntable and a structure for scanning the aforementioned sets, lead to a complicated apparatus. Furthermore, much time is necessary for the turning operation and the scanning operation, and this has led to the problem that the measurement cannot be executed in a short time.

In the case where the turntable is turned to change the filter, the spectral characteristics at different wavelengths cannot be simultaneously measured. In the case where the aforementioned sets are made to scan, the two-dimensional spectral characteristics cannot be simultaneously measured. Therefore, both of the above methods have had the problem that a moving sample cannot be correctly measured.

According to the above method (3), the measurement can be executed in a short time and spectral characteristics at different wavelengths can be simultaneously obtained.

However, the method necessitates a number of processing circuits for processing the data about the received light, outputted from the imaging means by the number corresponding to the number of the imaging means. This has led to the problem that the circuit scale of the processing circuit increases and the apparatus construction becomes complicated.

SUMMARY OF THE INVENTION

The present invention solves the aforementioned problems and has an object to provide a two-dimensional spectral characteristic measuring apparatus capable of simultaneously measuring the two-dimensional spectral characteristics with a simple construction.

The two-dimensional spectral characteristic measuring apparatus of the present invention comprises: a collimator lens which transforms a sample light from a sample into a pencil of parallel light; a plurality of band-pass filters which have mutually-different passbands; a plurality of lenses that are arranged in correspondence with the band-pass filters and converge the sample lights in specified image-forming positions to form two-dimensional images of the sample; and an image pick-up device which collectively picks up the plurality of two-dimensional images formed in the image-forming positions.

The two-dimensional spectral sensor for obtaining two-dimensional spectral information of the present invention comprises: a collimator lens for transforming the sample light from the sample into a pencil of parallel light; a plurality of band-pass filters having mutually-different passbands; a plurality of lenses that are provided in correspondence with the band-pass filters and form a plurality of two-dimensional images of the sample in specified image-forming positions; and an imaging device for collectively imaging the plurality of two-dimensional images formed in the image-forming positions.

According to these constructions, the sample light from the sample is transformed into the pencil of parallel light by the collimator lens and is spectrally separated by the band-pass filters. The plurality of two-dimensional images of the sample are formed in the specified image-forming positions by the lenses corresponding to the band-pass filters. Then, the plurality of two-dimensional images formed in this image-forming positions are collectively imaged, by which the two-dimensional spectral characteristics of the sample are simultaneously measured with the simple construction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 2(*a*) and FIG. 2(*b*) are graphs showing the spectral transmissivities of band-pass filters.

DESCRIPTION OF THE PREFERRED EMBODIMENTS

Figure 1:
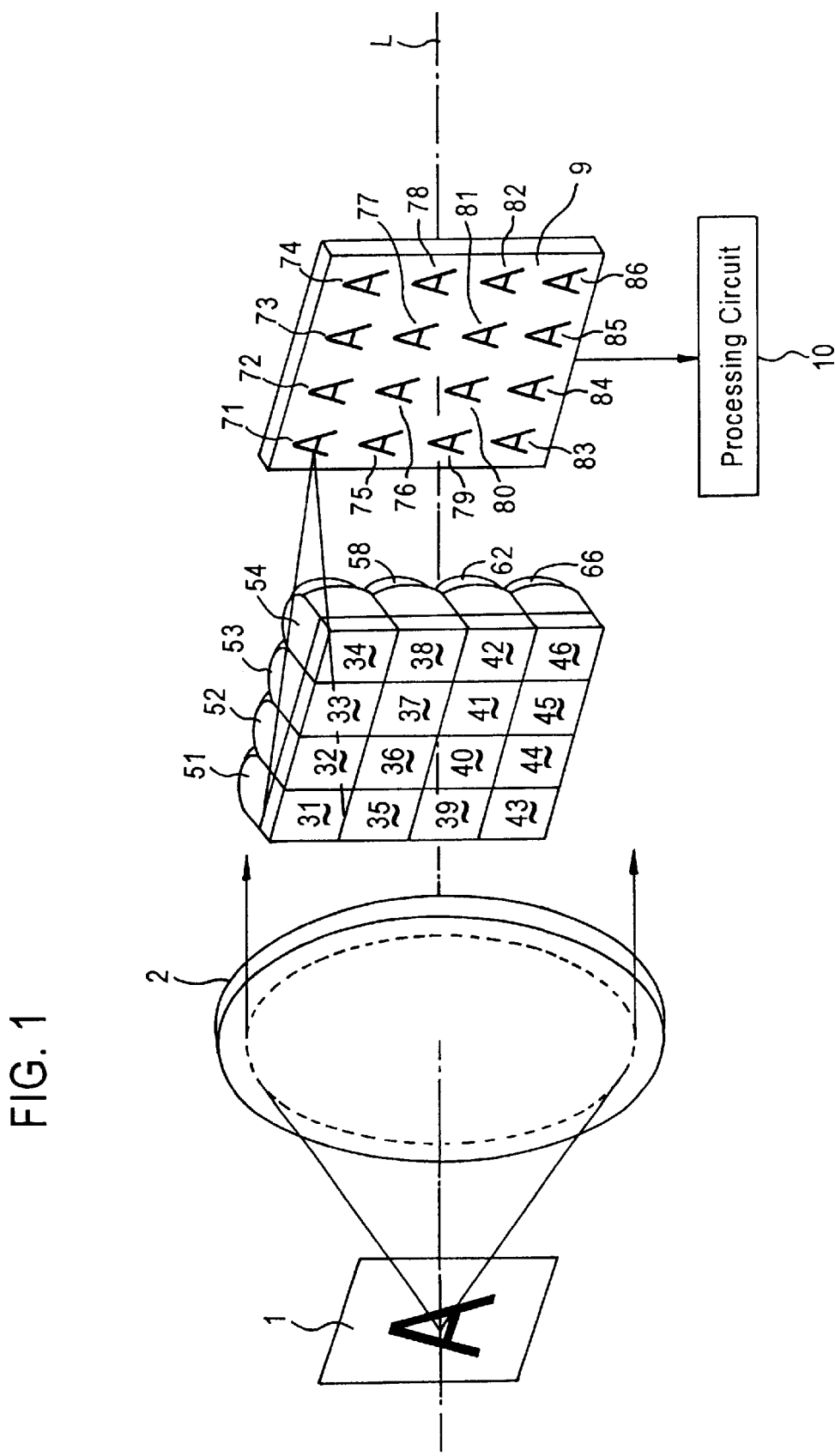
FIG. 1 is a schematic view of a two-dimensional spectral characteristic measuring apparatus according to an embodiment of the present invention.

FIG. 1 is a schematic view of a two-dimensional spectral characteristic measuring apparatus according to an embodiment of the present invention.

This spectral characteristic measuring apparatus measures two-dimensional spectral characteristics of a sample 1 at intervals of 20 nm in a visible range of 400 nm to 700 nm, and the apparatus includes a collimator lens 2, band-pass filters 31 through 46, lenses 51 through 66 and an area sensor (imaging means) 9, which are arranged in order on an optical axis L.

The collimator lens 2 transforms light outputted from the sample 1 arranged at the focal point thereof into a pencil of parallel light. The collimator lens 2 has the size of a value capable of covering all of the band-pass filters 31 through 46.

The band-pass filters 31 through 46 have mutually-different passbands. As shown in FIG. 2(*a*), the spectral transmissivity of the band-pass filter 31 has a center wavelength of 400 nm. The spectral transmissivities of the band-pass filters 32, 33, . . . have center wavelengths of 420 nm, 440 nm, . . . respectively. As shown in FIG. 2(*b*), the spectral transmissivity of the band-pass filter 46 has a center wavelength of 700 nm. The half width of the spectral transmissivities of the band-pass filters 31 through 46 are, for example, 20 nm.

The lenses 51 through 66 have an identical focal distance and are arranged in correspondence with the band-pass filters 31 through 46, respectively, with which they converge lights that have penetrated the band-pass filters 31 through 46 for the formation of images.

The area sensor 9 is arranged at the focal points of the lenses 51 through 66 and constructed of a number of imaging devices such as CCDs arranged two-dimensionally. The sensor receives optical images 71 through 86 formed by the lenses 51 through 66 and outputs the data about the received light, corresponding to the intensity of received light from every imaging device.

In this case, the collimator lens 2, the band-pass filters 31 through 46, the lenses 51 through 66 and the area sensor (imaging means) 9 constitute a two-dimensional spectral sensor.

A processing circuit 10 obtains the two-dimensional spectral characteristics of the sample 1 through calculation or the like by means of the data about the received light, outputted from each of the imaging devices of the area sensor 9.

It is to be noted that the two-dimensional spectral reflection characteristics of the sample 1 can be measured if the light from the sample 1 is reflected light, while the two-dimensional spectral transmission characteristics of the sample 1 can be measured if the light from the sample 1 is transmitted light.

The operation will be described next.

The image of the sample 1 is transformed into a pencil of parallel light by the collimator lens 2 and penetrates the band-pass filters 31 through 46, by which the image is spectrally separated according to the spectral transmissivities of the band-pass filters 31 through 46, respectively.

Then, light at 400 nm that has penetrated the band-pass filter 31 forms an image on the area sensor 9 by the lens 51 arranged in correspondence with the band-pass filter 31, so that an image 71 having a spectral characteristic at the wavelength of 400 nm is obtained.

Likewise, the lights that have penetrated the band-pass filters 32 through 46 form images on the area sensor 9 by the lenses 52 through 66 corresponding to the band-pass filters 32 through 46, respectively, so that images 72 through 86 are obtained.

As described above, the images spectrally separated by the band-pass filters 31 through 46 are formed in mutually-different positions on the area sensor 9. Therefore, by simply executing imaging one time, the two-dimensional spectral characteristics within the range of 400 nm to 700 nm can be obtained at intervals of 20 nm. By this operation, the two-dimensional spectral characteristics can be appropriately measured even when the sample 1 moves as in the case where the sample 1 is conveyed on a production line.

It is to be noted that the present invention is not limited to the above embodiment, and the following modified embodiments (1) through (5) can be adopted.

(1) The band-pass filters 31 through 46 are not limited to those of the above embodiment. They may be properly changed according to the demanded spectral characteristics by being increased or decreased in number from sixteen, setting the range of the center wavelength of the spectral transmissivity to 380 nm to 780 nm, setting the center wavelength interval to 10 nm or taking another measure.

(2) Although the lenses 51 through 66 are provided in correspondence with the band-pass filters 31 through 46, respectively in the above embodiment, this arrangement is not limited. It is acceptable to employ a lens array in which every group of four lenses (the lenses 51 through 54, for example) are integrally formed or a lens array in which the lenses 51 through 66 are totally integrally formed. Furthermore, the plurality of band-pass filters may be integrally formed with this lens array.

(3) It is acceptable to reversely arrange the band-pass filters 31 through 46 and the lenses 51 through 66. In more detail, it is acceptable to make the pencil of parallel light from the collimator lens 2 penetrate the lenses 51 through 66 and thereafter penetrate the band-pass filters 31 through 46. In this case, the distance between the lenses 51 through 66 and the area sensor 9 should be adjusted taking the refractive index of the material of the band-pass filters 31 through 46 into consideration.

(4) In the above embodiment, a relay lens system may be inserted between the lenses 51 through 66 and the area sensor 9.

(5) In the above embodiment, the sample 1 may be an image formed by a lens system.

As described above, the present invention has the insteps of transforming the sample light from the sample into the pencil of parallel light by the collimator lens, spectrally separating the light by the band-pass filters, converging the sample light into the specified image-forming position by the lens corresponding to each band-pass filter for the formation of the two-dimensional image of the sample and collectively imaging the plurality of two-dimensional images formed in the image-forming positions. Therefore, the two-dimensional spectral characteristics of the sample can be simultaneously measured with the simple construction. With this arrangement, the measurement of the two-dimensional spectral characteristics can be correctly executed even when the sample moves.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A two-dimensional spectral characteristic measuring apparatus, comprising:

a collimator lens which transforms a sample light from a sample into a pencil of parallel light;

a plurality of band-pass filters which have mutually-different passbands;

a plurality of lenses that are arranged in correspondence with the band-pass filters and converge the sample lights in specified image-forming positions to form two-dimensional images of the sample; and an image pick-up device which collectively picks up the plurality of two-dimensional images formed in the image-forming positions wherein said band-pass filters are arranged between said collimator lens and said lenses, and said pencil of parallel light is split by said lenses.

2. The two-dimensional spectral characteristic measuring apparatus as claimed in claim 1, further comprising:
   a processing circuit which calculates the two-dimensional spectral characteristics of the sample based on data outputted from the image pick-up device.

3. The two-dimensional spectral characteristic measuring apparatus as claimed in claim 2,
   wherein said sample light from the sample is reflected light and said processing circuit calculates a two-dimensional spectral reflection characteristics of the sample.

4. The two-dimensional spectral characteristic measuring apparatus as claimed in claim 2,
   wherein said sample light from the sample is transmitted light and said processing circuit calculates a two-dimensional spectral transmission characteristics of the sample.

5. The two-dimensional spectral characteristic measuring apparatus as claimed in claim 1,
   wherein said lenses is a lens array in which lenses are integrally formed.

6. The two-dimensional spectral characteristic measuring apparatus as claimed in claim 5,
   wherein said plurality of band-pass filters are integrally formed with said lens array.

7. The two-dimensional spectral characteristic measuring apparatus as claimed in claim 1,
   wherein the sample is an image formed by a lens system.

8. A two-dimensional spectral sensor comprising:
   a collimator lens which transforms a sample light from a sample into a pencil of parallel light;
   a plurality of band-pass filters which have mutually-different passbands;
   a plurality of lenses that are provided in correspondence with the band-pass filters and form a plurality of two-dimensional images of the sample in specified image-forming positions; and
   an image sensor which collectively picks up the plurality of two-dimensional images formed in the image-forming positions
   wherein said band-pass filters are arranged between said collimator lens and said lenses, and said pencil of parallel light is split by said lenses.

9. The two-dimensional spectral sensor as claimed in claim 8,
   said plurality of lenses are arranged between the plurality of band-pass filters and the image sensor.

10. The two-dimensional spectral sensor as claimed in claim 8,
    wherein said lenses is a lens array in which lenses are integrally formed.

11. The two-dimensional spectral sensor as claimed in claim 10,
    wherein said plurality of band-pass filters are integrally formed with said lens array.

12. A two-dimensional spectral characteristic measuring apparatus, comprising:
    a collimator lens which transforms a sample light from a sample into a pencil of parallel light;
    a plurality of band-pass filters which have mutually-different passbands;
    a plurality, of lenses that are arranged in correspondence with the band-pass filters and converge the sample lights in specified image-forming positions to form two-dimensional images of the sample;
    an image pick-up device which collectively picks up the plurality of two-dimensional images formed in the image-forming positions and outputting data; and
    a processing circuit which calculates the two-dimensional spectral characteristics of the sample based on the data outputted from the image pick-up device
    wherein said band-pass filters are arranged between said collimator lens and said lenses, and said pencil of parallel light is split by said lenses.

* * * * *